(12) United States Patent
Babich

(10) Patent No.: US 11,949,491 B2
(45) Date of Patent: *Apr. 2, 2024

(54) TELECOMMUNICATIONS SYSTEM UTILIZING DRONES

(71) Applicant: Skywave Networks LLC, Chicago, IL (US)

(72) Inventor: Kevin J. Babich, Valparaiso, IN (US)

(73) Assignee: Skywave Networks LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/059,201

(22) Filed: Nov. 28, 2022

(65) Prior Publication Data

US 2023/0379042 A1 Nov. 23, 2023

Related U.S. Application Data

(63) Continuation of application No. 15/929,276, filed on Apr. 21, 2020, now Pat. No. 11,515,931, which is a
(Continued)

(51) Int. Cl.
*H04B 7/185* (2006.01)
*H04L 1/08* (2006.01)
*H04W 16/18* (2009.01)

(52) U.S. Cl.
CPC .......... *H04B 7/18504* (2013.01); *H04L 1/08* (2013.01); *H04W 16/18* (2013.01)

(58) Field of Classification Search
None
See application file for complete search history.

(56) References Cited

U.S. PATENT DOCUMENTS

| 7,764,229 B2 | 7/2010 | Smoot et al. |
| 8,116,763 B1 | 2/2012 | Olsen |

(Continued)

FOREIGN PATENT DOCUMENTS

| EP | 3399666 A1 | 11/2018 |
| EP | 3663199 A1 | 6/2020 |

(Continued)

OTHER PUBLICATIONS

Arikan, Toros, Thesis—Minimum-Delay HF Communications, University of Illinois at Urbana-Champaign Retrieved from the Internet: https://www.ideals.illinois.edu/bitstream/handle/2142/97507/ARIKAN-THESIS-2017.pdf?sequence=1, 60 pages, Nov. 28, 2017.

(Continued)

*Primary Examiner* — Ajit Patel
(74) *Attorney, Agent, or Firm* — Woodard, Emhardt, Henry, Reeves & Wagner, LLP

(57) ABSTRACT

Wireless communication is provided over an extended distance using a line or a series of drones traveling along a transmission path between a transmitter and a receiver. The transmitter sends a data signal to a first drone that is within range of the transmitter. The first drone sends the data signal to an adjacent drone in the line of drones which retransmits the data signal to the next drone in line. The data signal is transmitted between drones until it reaches a final drone within range of the receiver. The final drone transmits the data signal to the receiver. As the drones travel along the transmission path, new drones are launched from a location within range of the transmitter to replace drones that land after transmitting a data signal to the receiver.

16 Claims, 10 Drawing Sheets

Related U.S. Application Data continuation of application No. PCT/US2018/057207, filed on Oct. 24, 2018.

(60) Provisional application No. 62/576,885, filed on Oct. 25, 2017.

(56) References Cited

U.S. PATENT DOCUMENTS

| | | |
|---|---|---|
| 9,136,938 B1 | 9/2015 | Babich |
| 9,215,008 B2 | 12/2015 | Hastings, Jr. et al. |
| 9,300,388 B1 | 3/2016 | Behroozi et al. |
| 9,407,362 B2 | 8/2016 | DeVaul et al. |
| 9,471,064 B1 | 10/2016 | Boland et al. |
| 9,533,759 B2 | 1/2017 | Jones et al. |
| 9,590,298 B1 | 3/2017 | Buchmueller et al. |
| 9,596,020 B2 | 3/2017 | Frolov et al. |
| 9,602,190 B2 | 3/2017 | Keremedjiev |
| 9,660,718 B2 | 5/2017 | Jalali et al. |
| 9,973,261 B1 * | 5/2018 | Hardy .................. G06V 20/13 |
| 10,034,209 B1 | 7/2018 | Nandan et al. |
| 2011/0184590 A1 | 7/2011 | Duggan et al. |
| 2014/0086588 A1 | 3/2014 | Kawanishi et al. |
| 2015/0236778 A1 | 8/2015 | Jalali |
| 2015/0244451 A1 | 8/2015 | Baeckman et al. |
| 2015/0334768 A1 * | 11/2015 | Ranasinghe .......... H04W 4/021 370/328 |
| 2016/0028471 A1 | 1/2016 | Boss et al. |
| 2016/0050012 A1 | 2/2016 | Frolov et al. |
| 2016/0363929 A1 | 12/2016 | Clark et al. |
| 2017/0081026 A1 | 3/2017 | Winn et al. |
| 2017/0092109 A1 * | 3/2017 | Trundle ................ G08B 25/006 |
| 2017/0111228 A1 * | 4/2017 | Obaidi .................. H04W 24/02 |
| 2017/0117954 A1 * | 4/2017 | Keremedjiev ......... G06Q 40/04 |
| 2017/0208512 A1 | 7/2017 | Aydin et al. |
| 2017/0230100 A1 | 8/2017 | Babich |
| 2018/0319495 A1 * | 11/2018 | Tu ........................ B64C 39/024 |
| 2021/0126703 A1 | 4/2021 | MacNeille et al. |

FOREIGN PATENT DOCUMENTS

| | | | |
|---|---|---|---|
| KR | 101770113 B1 | 8/2017 | |
| WO | 1997033790 A1 | 9/1997 | |
| WO | 2015130414 A1 | 9/2015 | |
| WO | 2016028767 A1 | 2/2016 | |
| WO | 2017066647 A1 | 4/2017 | |
| WO | WO-2019040072 A1 * | 2/2019 | ........... H04B 7/0617 |

OTHER PUBLICATIONS

EP, EP App. No. 18871775 Extended European Search Report, dated Jul. 16, 2021.

GB, Examination Report under Section 18(3) for Great Britain Patent App. No. G82007721.0, 5 pages, dated Mar. 21, 2022.

GB, GB Application No. 2007721.0 Examination Report, 4 pages, dated Jul. 13, 2022.

* cited by examiner

TELECOMMUNICATIONS SYSTEM UTILIZING DRONES

CROSS-REFERENCE TO RELATED APPLICATION

This application is a continuation of U.S. patent application Ser. No. 15/929,276, filed Mar. 4, 2021, which is hereby incorporated by reference. U.S. patent application Ser. No. 15/929,276, filed Mar. 4, 2021, is a continuation of International Patent Application Number PCT/US2018/057207, filed Oct. 24, 2018, which are hereby incorporated by reference. International Patent Application Number PCT/US2018/057207, filed Oct. 24, 2018, claims the benefit of U.S. Patent Application No. 62/576,885, filed Oct. 25, 2017, which are hereby incorporated by reference.

BACKGROUND

High-speed wireless communication over long distances may be desired in a number of industries. The line-of-sight method for propagation is useful for wireless communication over a short distance, but over long distances obstructions and the curvature of the Earth prevent line-of-sight propagation from being a reliable method of data transmission. In order to transmit data to a receiver where line-of-sight propagation is not available, there are non-line-of-sight propagation methods that may be used for transmission. These methods may include skywave propagation, groundwave propagation, or other methods of transmission to communicate the data signal. However, these methods may not be able to transmit data at the speed desired by a user.

Thus, there is a need for improvement in this field.

SUMMARY

A data communication system provides high-speed wireless communication over extended distances. With this system, a line of drones are sequentially launched from a prevailing upwind location and form a generally straight geodesic line between the transmission point and receipt point and vice versa. The winged drones travel generally along the geodesic path and are pushed by the prevailing winds towards a landing location. The system is designed to maintain spacing between the drones.

At or near the launch site, an uplink is established to transmit data to the recently-launched drone. That drone then retransmits via a steerable antenna to the next drone in the line of drones, and the transmission and retransmission continues down the line of drones until it reaches at or near a downlink site that receives the transmission. In one form, a parabolic array is used for transmissions to and from the ground sites, and a steerable antenna is located in the wings of the drones for transmission between the drones. With this system, the drones form a virtual conveyor belt of transmission antennas in the sky. In one form, direct line-of-sight transmissions such as microwave transmissions are used to transmit between the drones, but other frequencies can be used. The steerable antenna can include mechanically and/or electronically steerable antennas.

Conceivably, the drones can be spaced significantly larger distances apart as they do not have to deal with the curvature of the Earth. For instance, the drones can be spaced at around 500 miles apart or can be spaced further or closer together, depending on environmental or other requirements. The steerable antennas are also used to track the location of the next drone and further help in locating and spacing the drones apart. This system helps to transmit large amounts of data rather quickly. Moreover, once landed, the drones can be recycled and shipped back to the launch site for further use. The drones also can incorporate other forms of power such as solar power, and by following the prevailing wind patterns can utilize less energy.

While the system will be described with reference to executing financial trading strategies, this system and technique can be used in other situations or industries where time and/or bandwidth are of concern. For example, this system can be used to perform remote surgery or medical diagnostics, scientific instruments or studies (e.g., for astronomy or physics), controlling dispersed global computer networks, and/or military applications. In another example, the technique can be used for underlying maintenance or enhancements to the communication system itself. By way of a non-limiting example, since the files are typically large, code for programming and/or reprograming the drones, modems, antennas, and/or other system equipment can be sent via the drone and/or along another high bandwidth, high latency link, such as a fiber optic cable. Alternatively or additionally, some or all of the code can be sent via skywave propagation (e.g., radio) and/or via line of site transmission, such as via microwaves. The code can include one or more programs, libraries, data, and/or subroutines for controlling the equipment depending on various circumstances. The resulting changes can be software changes that change the function of the equipment and/or physical changes to the equipment, such as to the height and/or angle of the antenna system. Later on, depending on the needs at that time, different subroutines, programs, data, and/or areas of the code can be selected. Updates or changes to the code can be sent periodically, continuously, or on an as-needed basis.

Further forms, objects, features, aspects, benefits, advantages, and embodiments of the present invention will become apparent from a detailed description and drawings provided herewith.

DESCRIPTION OF THE SELECTED EMBODIMENTS

Figure 1:
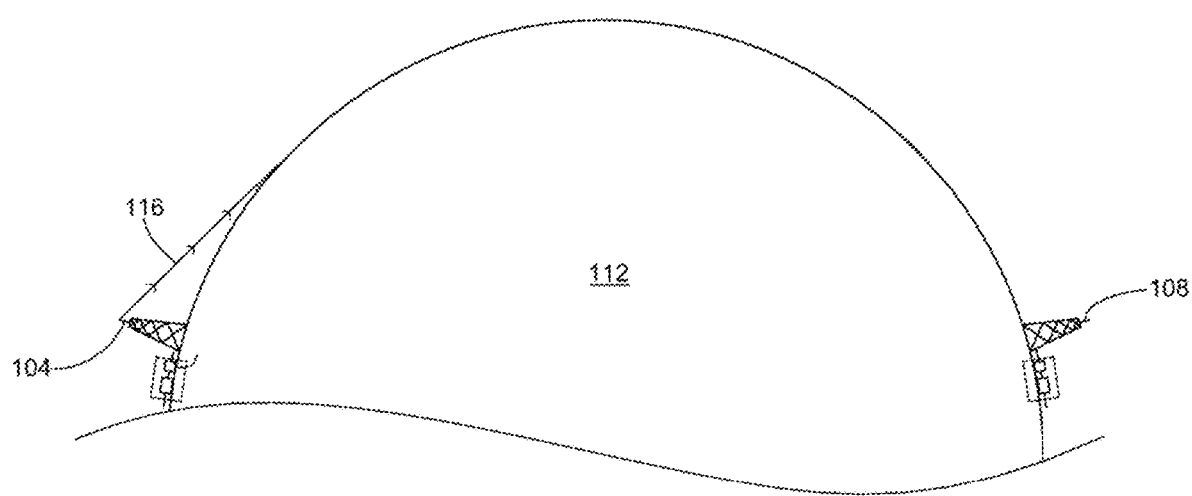
FIG. 1 is a schematic diagram of a system using line-of-sight propagation to transmit data.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

Wireless communication may be used to send data quickly over a long distance. In some cases, the transmitter and the receiver may be relatively close, and line-of-sight propagation may be used to transmit the desired data. Line-of-sight propagation sends electromagnetic waves in a straight line from the transmitter to the receiver. However, line-of-sight transmissions generally cannot travel over the horizon or past other obstacles. Therefore, when the receiver is too far away from the transmitter, line-of-sight propagation does not work. As illustrated in FIG. 1, a transmitter 104 and a receiver 108 may each be located on the Earth 112, but may be too far away from each other to use line-of-sight propagation to communicate. An electromagnetic wave 116 sent in a straight line from the transmitter 104 is blocked from reaching receiver 108 due to the curvature of the Earth 112. While one location will be described as a "transmitter" station and the other as a "receiver" station, the transmitter 104 and receiver 108 locations can be swapped and/or one or both can act as a transceiver to facilitate two-way communication.

Skywave propagation is an alternative method to transmit data from transmitter 104 to receiver 108. Skywave propagation uses reflection of a high frequency electromagnetic wave off the surface of the Earth 112 and reflection from the ionosphere to bounce the electromagnetic waves from the transmitter 104 to the receiver 108. This process can reliably transmit data; however changes in the ionosphere and reflection from the Earth 112 have the potential to cause distortion in the transmitted data signal. Additionally, adding reflection points increases the distance the data signal travels from the transmitter 104 to the receiver 108. This added distance can increase latency and delay the receipt of the data signal at the receiver 108. As will be explained below, skywave propagation can be used in conjunction with the drone-based data transmission system described below.

Figure 2:
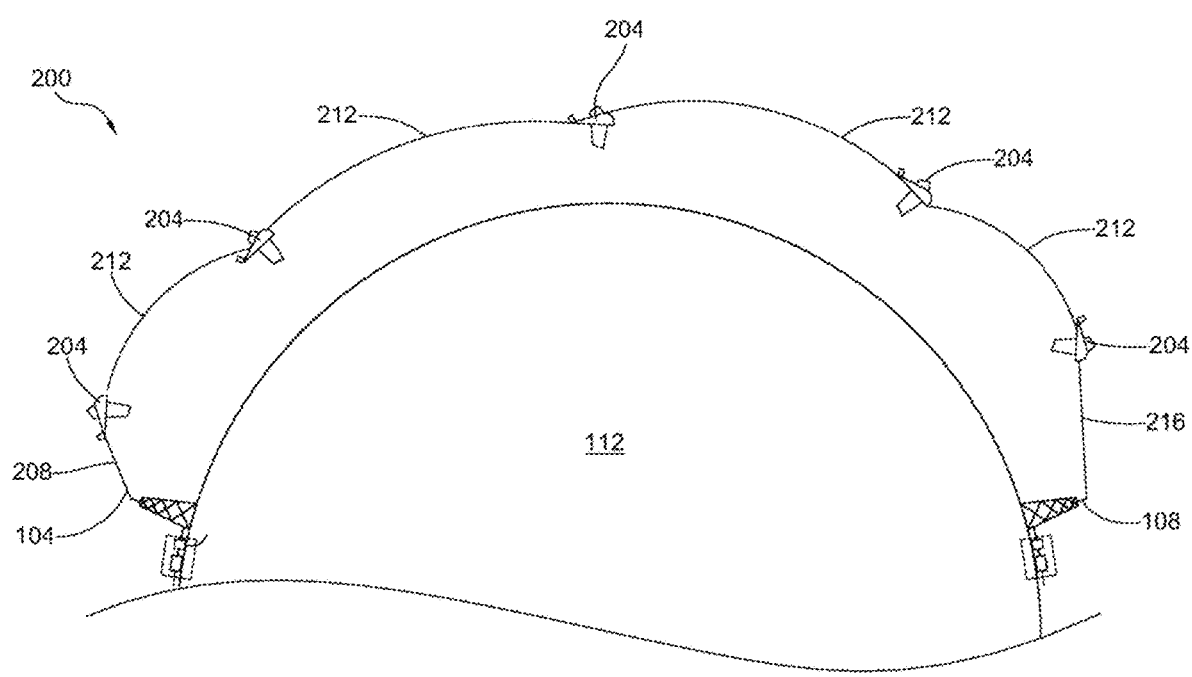
FIG. 2 is a schematic diagram of a data transmission system.

FIG. 2 shows a data transmission system 200 for sending a data signal from the transmitter 104 to the receiver 108. The data transmission system 200 uses a line of one or more drones or unmanned aerial vehicles (UAVs) 204 as relays to transmit the data signal. The data signal is sent from a transmitter 104 over a first communication path 208 to a first drone 204. As an example, the transmitter 104 may be a parabolic array located at a ground site that generates a data signal that is to be sent to the receiver 108. The parabolic array sends the data signal to the nearest drone 204. The data signal may be transmitted using any suitable transmission medium. Because a drone 204 should be relatively close to the transmitter 104, a line-of-sight transmission, such as microwave transmission, may be used to send the data signal from the transmitter 104 to a drone 204. In other examples, radio waves may be used to transmit the data signal. In other variations, other types of communication paths and techniques are used in conjunction with the drones 204. For instance, skywave propagation and/or fiber optic communication channels can transmit data along at least one of the legs to, from, and/or between the transmitter 104, receiver 108, and/or drones 204.

The first drone 204 receives the data signal sent from the transmitter 104 over an uplink communication path 208 and redirects data signal to the next drone 204 in line over a drone-to-drone communication path 212. The next drone 204 receives the data signal and redirects the data signal over a new drone-to-drone communication path 212 to the next drone 204 in line. This process continues with each subsequent drone 204 as the data signal proceeds toward the last drone 204. The last drone 204 redirects the data signal over a downlink communication path 216 where the data signal is received by the receiver 108. As noted before, the done-to-drone communication paths 212 can include other forms of communication, such as indirect forms like skywave propagation. In some examples, one or more of the drones 204 at times can be replaced with a human operated aircraft that is used to communicate the data signals.

As the data signal is transmitted, the drones travel in a direction toward the receiver 108. The drones 204 may be launched from an upwind location so that the drones 204 are pushed by prevailing winds to reduce the power necessary to move the drones 204. In some embodiments, the drones 204 may also include a power source that works with the wind to move the drone 204 toward the receiver 108. In one example, each drone 204 is guided electronically, for example using GPS and/or transponders, and/or may be guided mechanically using a gyroscope or another mechanical instrument. The drones 204 in one form are fully autonomous, but some or all of the drones 204 in other variations are semi-autonomous and/or manually controlled by a remote operator. As a drone 204 approaches the receiver 108, the drone 204 lands and may be returned to the launch location for reuse. This process creates a virtual conveyor belt of drones 204 between the transmitter 104 and the receiver 108. As one drone approaches the receiver 108 and lands, another drone 204 may be launched from a position near the transmitter 104 to ensure that the number of drones 204 in the air is sufficient to relay the data signal from the transmitter 104 to the receiver 108. After a drone 204 has landed, it may be recycled and shipped back to the launch point, where the drone 204 may be prepared for reuse.

In some embodiments, the drones 204 may be launched from the same location as the transmitter 104. However, because the transmitter 104 is able to transmit a data signal over a relatively large distance, it is not necessary that the drones 204 be launched at the same location as the transmitter. In other embodiments, the drones 204 may be launched from a different location close enough to the transmitter 104 to stay within range of the transmitted data signal. This can reduce the flight time for each drone 204, saving power and decreasing wear and tear on the drone 204. As an example, the transmitter 104 in one form may have a range of 500 miles, therefore, a drone 204 can be launched from anywhere within the 500 miles radius and still be able to receive the data signal from the transmitter 104. Likewise, the drone 204 may land at the location of the receiver 108, or may land at another location after the data signal has been relayed to the receiver 108. In another variation, the drones 204 are launched upwind from the transmitter 104 and land downwind from the receiver 108. To provide redundancy, a group of multiple drones 204 are launched as a swarm from the same general area at nearly the same time, and followed by other swarm groups. The multiple swarm groups of drones 204 form a mesh network between the transmitter 104 and receiver 108 so as to provide robust communication network. If one of the drones 204 malfunctions and/or falls out of range, the other drones 204 still can maintain the communication link. This ability of the drones 204 to swarm and form a mesh network can be helpful when the drones 204 are underpowered (or even unpowered) for the current environmental conditions (i.e., high winds). For instance, the drones 204 can include balloons, dirigible airships, blimps, airplanes, helicopters, quadcopters, gliders, and/or other types of aircraft.

Figure 3:
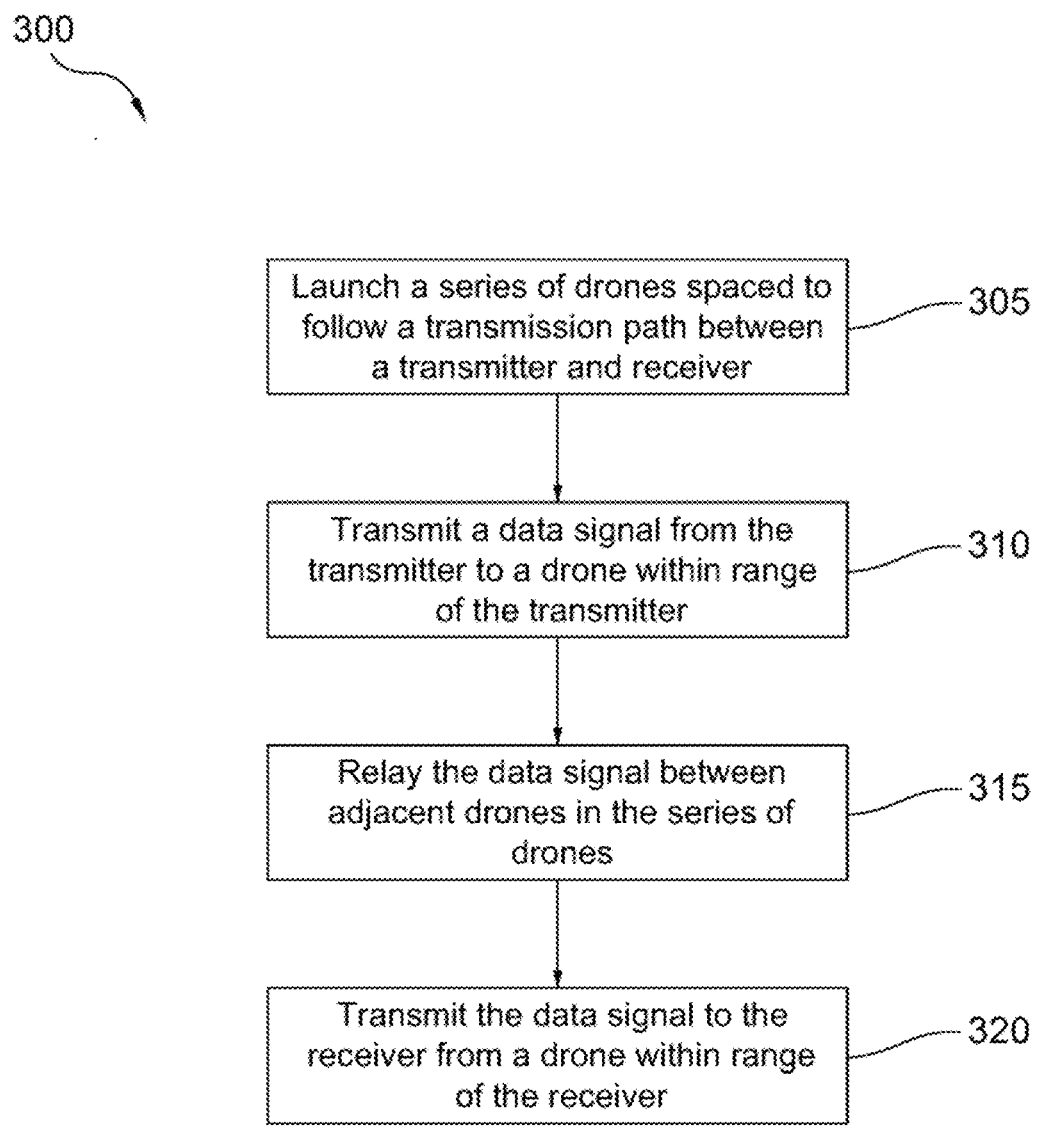
FIG. 3 is a flowchart showing a method of data transmission using the data transmission system of FIG. 2.

The flowchart 300 shown in FIG. 3 describes a method of data transmission as shown in the data transmission system 200. A series of drones 204 are launched 305 from a position so that at least one of the drones is within range of a transmitter 104. The drones 204 are spaced apart from each other and directed to follow a transmission path between the transmitter 104 and a receiver 108. Once at least the series of drones has been arranged along the transmission path, a data signal is transmitted 310 from the transmitter 104 to a drone 204 that is within range of the transmitter 104. The data signal is then relayed 315 between adjacent drones 204 in the series so that the data signal is sent in the direction of the receiver 108. In other examples, the data signals can be relayed to non-adjacent drones 204 so as long as the drones 204 are in close enough range to communicate with one another. When the data signal reaches a drone 204 that is within range of the receiver 108, the data signal is transmitted 320 from the drone 204 to the receiver 108. In another variation, multiple drones 204 are scattered and/or are arranged in a swarm along the transmission path so as to create a mesh network. This mesh network arrangement again provides multiple communication paths as well as redundancy so as to make the overall system more robust. It should be recognized that communication along the transmission system 200 can be bi-directional such that signals can be transmitted from the receiver 108 to the transmitter 104 and vice-versa. In other words, the data signals can be transmitted in the opposite direction from which the drones 204 fly and/or in the same general direction as the drones 204 travel. Other data, such as used for modem management and/or requiring different bandwidth (and/or latency), can alternatively or additionally be sent along other communication paths like fiber optic cables, microwave towers, and/or skywave propagation paths. In further examples, the drones 204 only cover part of the transmission path, and other communication paths or systems (e.g., fiber optic cables, microwave towers, and/or skywave propagation paths) are used to complete the communication link.

In some cases, it may be desired for the data signal to be sent from the transmitter 104 to the receiver 108 as quickly as possible. For example, the data transmission system 200 may be used by financial trading firms for high-frequency trading, where trading strategies are carried out on computers to execute trades in fractions of a second. In high-frequency trading, a delay of only milliseconds may cost a trader millions of dollars; therefore, the speed of transmission of trading instructions is as important as the accuracy of the data transmitted. The trading firm and/or third parties may send news, trading instructions, and/or other types of data that could assist the trading firm in making trading decisions from the transmitter 104 to the receiver 108 (and vice-versa) using the data transmission system 200. This system 200 and technique can be used in other situations or industries where latency and/or bandwidth are of concern. Once more, this system 200 can be for example used to perform remote surgery or medical diagnostics, operate scientific instruments or studies (e.g., for astronomy or physics), control dispersed global computer networks, and/or military applications. The technique can also be used for underlying maintenance and/or enhancements to the system 200 itself.

Figure 4:
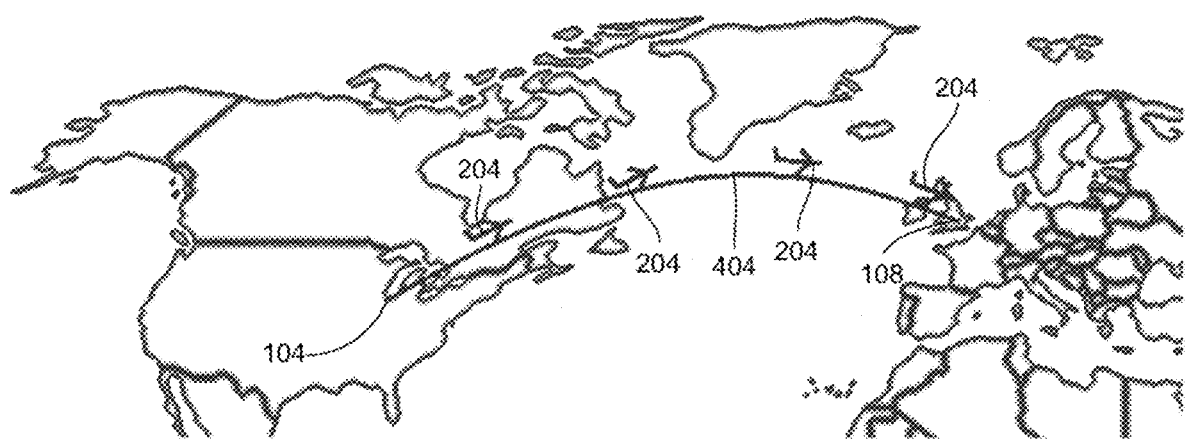
FIG. 4 is a map showing a communication path for the data transmission system of FIG. 2.

To reduce transmission time, it may be desired that the length of the transmission path is reduced so that the drones 204 travel along the shortest possible path from the transmitter 104 to the receiver 108. When covering long distances, a geodesic line represents the shortest route between two points on the Earth's surface. Typically, a geodesic line is a segment of a great circle, formed along the intersection of a sphere and a plane passing through the center of the sphere. FIG. 4 illustrates a possible route from Chicago to London along a transmission path that is a geodesic path 404. Often, a geodesic line appears to be curved when the geodesic line is projected onto a two-dimensional surface, such as a map. In the example shown in FIG. 4, each of the drones 204 travels generally along a geodesic path 404 following the geodesic line between Chicago and London. The drones 204 can generally travel along other geodesic paths 404 along the globe, such as from New York City to London or Seattle to Hong Kong. The timing of the launch of the drones 204 is calculated to maintain adequate spacing between the drones 204. In some embodiments, the launch of the drones may be designed to keep the drones 204 spaced at roughly equal distances from the directly preceding and directly trailing drones 204. However, other systems may have uneven spacing between the drones 204 traveling along geodesic path 404. In still yet other examples, the drones 204 have a mesh network type arrangement along the geodesic path 404 such that the drones 204 are launched in waves and/or on a random basis. The system 200 in other examples can have multiple transmitters 104 and/or receivers 108 generally located along the geodesic or other paths. In this case, the drones 204 can form multiple combinations of communication circuits between the transmitters 104 and receivers 108.

Figure 5:
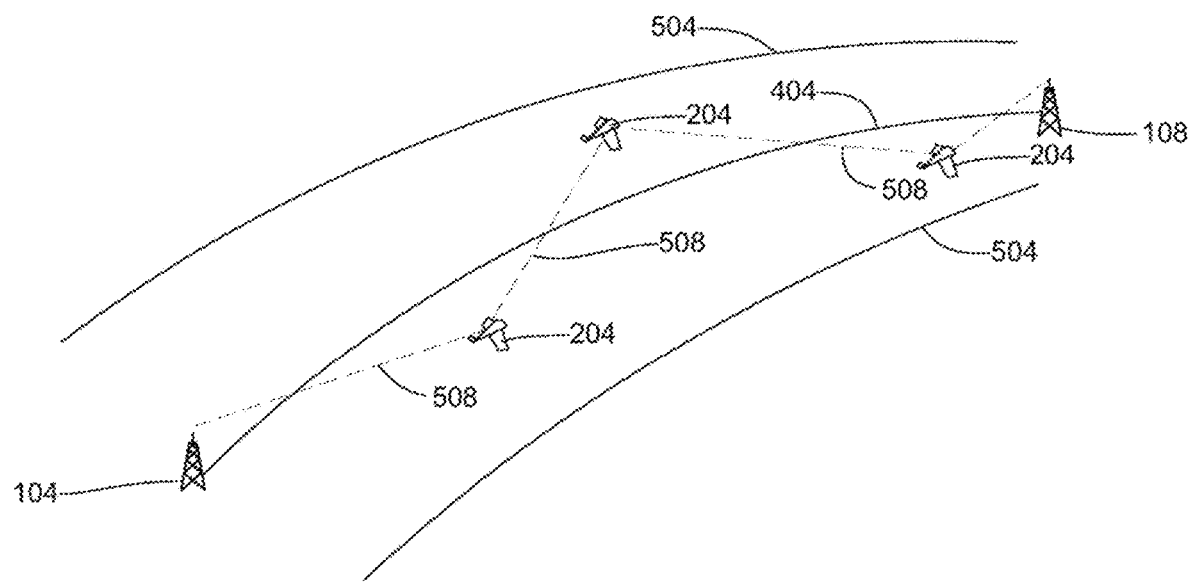
FIG. 5 is a schematic diagram of a communication path.

As shown in FIG. 5, the drones 204 may not exactly follow the geodesic path 404 when traveling toward the transmitter 108. Instead, the drones generally follow the geodesic path 404 but stay within a band/or zone 504 surrounding the geodesic path 404. The band 504 can include both horizontal as well as vertical limits. In one form, the band 504 is narrow enough to allow the drones 204 within the band 504 to communicate with adjacent drones 204. Factors such as wind speed, wind direction, takeoff location, storms, and/or landing location may vary the location of an individual drone 204 from being directly on the geodesic path 404. Also, because wind conditions may be different at different locations along the geodesic path 404, it is possible that one drone 204 may be on one side of geodesic path 404 while an adjacent drone 204 is on the other side of geodesic path 404. The varying wind conditions may also vary the heading and/or orientation of adjacent drones 204. The drone 204 in one example can have different yaw, pitch, and/or roll angles. For example, one drone 204 may be pointed east, while an adjacent drone 204 may be pointed northeast. However, due to different wind directions at different locations, each drone 204 may still be traveling generally along the same geodesic path 404. In another example, the drones 204 do not travel along a path that is different from the geodesic path 404. In other words, the drones 204 in this example do not travel along the geodesic path 404. The system 200 in further variations have the drones 204 only partially travel in the band 504 along the geodesic path 404. For instance, the drones 204 can be routed before take-off and/or re-routed during flight to take one or more different flight paths that deviate from the band 504 and/or geodesic path 404 due to weather conditions, restricted airspace, interference, and/or other concerns.

In other examples, the drones 204 form multiple groups that only travel a portion of the geodesic 404 or other paths between the transmitter 104 and receiver 108. The groups of drones 204 complete the entire communication path. For instance, a first group of drones 204 are circulated in a conveyor type fashion along a first leg of the geodesic path 404, and a second group of drones 204 are circulated along a second leg of the geodesic path 404. Together the first and second legs of drones 204 cover the entire geodesic path 404. At each leg, the drones 204 are recirculated from the landing location back to the takeoff location for that particular leg. In other examples, the paths can include more than two legs. This multi-leg configuration can be used to address fuel, power, maintenance, operational, and/or other limitations of the drones 204. In addition, different legs along the path can used for different types of drones depending on the needs. For instance, balloons can be used to cover vast open ocean legs while powered aircraft can cover legs that fully or partially travel over land. Drones 204 over some of the legs can be designed to be disposable in an environmentally favorable manner, such that the drones 204 are able to crash land in the ocean and do not need to be recovered (but can be recovered if so desired). In other examples, the drones along a land based leg can be designed for terrestrial landing by having landing gear, and drones 204 along water (e.g., oceanic) legs can include water landing gear, such as pontoons, that facilitate water recoveries of the drones 204. Alternatively or additionally, some or all of the drones 204 in the system 200 can travel along multi-hop legs. Instead of being recirculated back to the take-off location, the drone 204 upon landing is refueled, serviced, and/or modified so that the drone 204 is able to subsequently travel along the next leg. Before, during, and/or even shortly thereafter the one drone 204 landing, one or other drones 204 are launched to fly along the next leg so as to take the place of the landing drone 204 in order to minimize communication interruptions. This multi-hop approach can be combined with the previously described drone recirculation leg approach such that certain legs recirculate the drones 204, other legs allow the drone to hop to the next stage, and still yet other legs use both approaches. In other variations, multiple legs overlap one another in a staggered fashion to enhance network reliability.

As illustrated in FIG. 5, despite the drones 204 having varying headings and locations near the geodesic path along the geodesic path 404, communication between the transmitter 104, the receiver 108, and the drones 204 can ensure that the data signal 508 is directed to the correct location. As will be explained in greater detail below, the drones 204 include electronically and/or mechanically steerable antennas to direct the signals between the drones. The steerable antennas are able to compensate for differences of location, yaw, pitch, and/or roll angles between two communicating drones 204. The drones can include GPS systems, transponders, and/or other locating equipment so as to assist in aiming the antennas. The communicating drones 204 can also communicate to each other their location, orientation, signal strength, and/or other information that would aid in communication between the drones 204.

Figure 6:
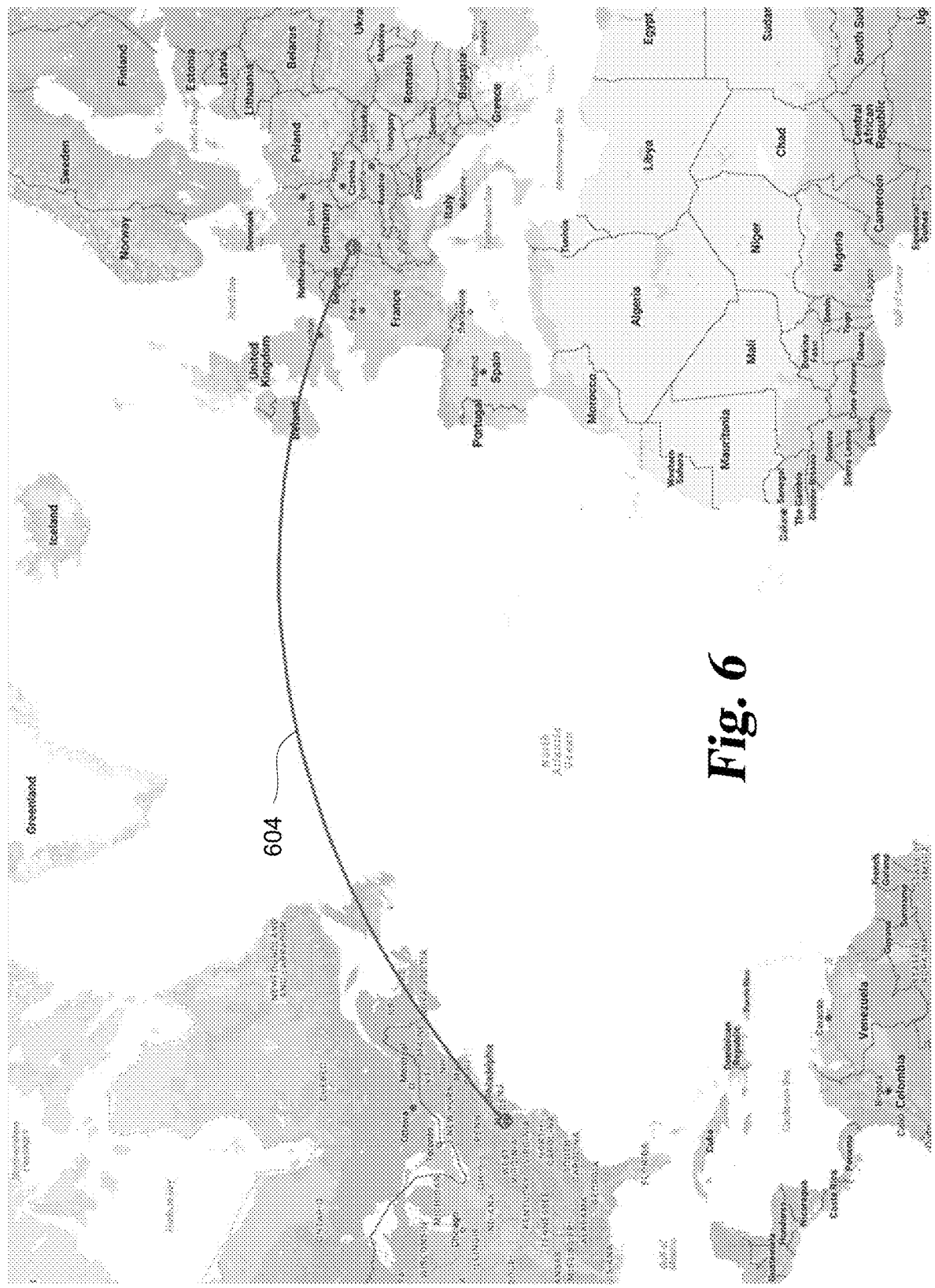
FIG. 6 is a map showing a geodesic path for the communication path of FIG. 2.
Figure 7:
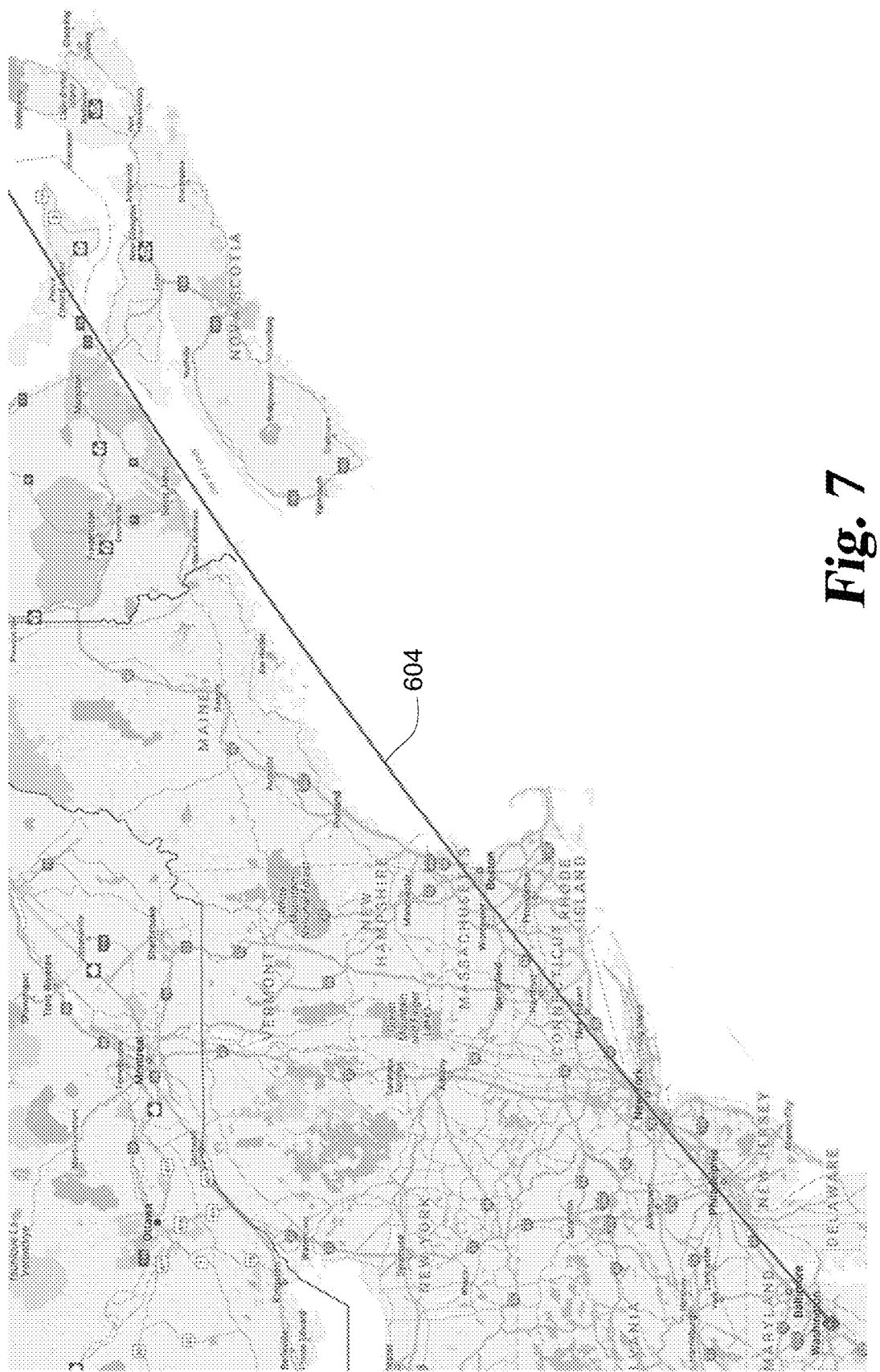
FIG. 7 is a map showing a portion of the geodesic path of FIG. 6.
Figure 8:
FIG. 8 is a map showing a portion of the geodesic path of FIG. 6.

FIGS. 6, 7, and 8 show another example of a geodesic path 604 that extends between Washington DC, USA and Mannheim, Germany. This geodesic path 604 runs in proximity to many large financial centers. For example, FIG. 5 shows that the geodesic path 604 is close to Baltimore, Philadelphia, New York, and Boston. In FIG. 6, it is shown that geodesic path 604 is also close to Dublin, London, Brussels, and Frankfurt. A line, multiple legs, and/or swarms of drones 204 may extend generally on geodesic path 604 and provide access to transmitters and receivers in any of these cities. For example, data may be transmitted from New York to London using the line of the drones on geodesic path 604. After the data has been transmitted from New York to London, it may be desired to send another set of data from Boston to Frankfurt. The transmitter in Boston transmits the data to the same line of drones on geodesic path 604 and the drones are capable of relaying this data to a receiver in Frankfurt.

An aircraft heading is the direction in which the aircraft nose is pointing. Due to the force created by wind, the direction of movement of the aircraft, or its track, is not the same as its heading. The drift angle is the angle between the aircraft's heading and its track, and the crab angle is the amount of correction an aircraft must be turned into the wind in order to maintain its desired course. The crab angle is generally opposite in direction to the drift angle and approximately equal in magnitude for generally smaller angles. To conserve power, the drones 204 may take a path that varies from the geodesic path 604. The power needed to maintain the crab angle of the drone 204 may increase the amount of energy used on a particular flight. Generally, the greater the crab angle of the drone, the slower the drone travels along the geodesic line 604 which in turn creates a longer flight. To address this, a predictive model can be used in which the drone 204 does not travel along the geodesic path but within a constrained area that has less wind so as to conserve power and/or fuel. In one form, a ground-based station may use predictive models to reroute the drone. For instance, a ground-based system and/or the drone 204 may reroute the path of the drone 204 away from the geodesic path 604 so as to avoid specific weather conditions where the drone 204 cannot fly such as in strong storms and/or high wind conditions. The drones 204 can be routed around the storm so as to conserve energy while at the same time providing the shortest pathway for communication. In another variation, the drone 204 controls itself to avoid the weather pattern and/or a combination of ground-based and/or drone-based control systems can be used to change the path of the drone 204. For example a clustering approach can be used in which information from other drones 204 provides weather, power consumption, wind speed, and/or crab angle information so that the drone 204 and/or the ground station can make appropriate corrections to conserve energy.

Figure 9:
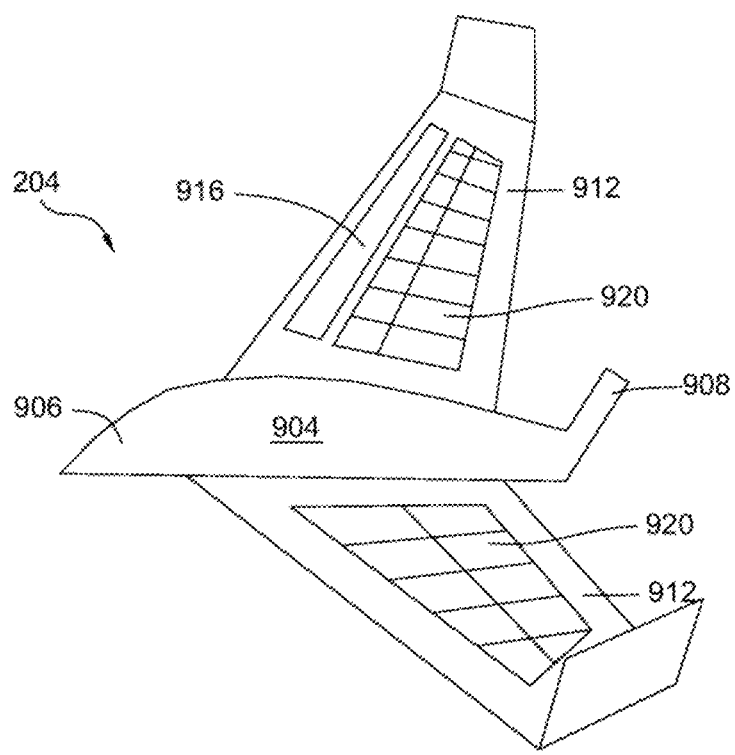
FIG. 9 is a perspective view of a drone from the data transmission system of FIG. 2.

FIG. 9 illustrates an example of a drone 204 that may be used in the data transmission system 200. Drone 204 includes a body 904 with a nose 906, tail 908 and wings 912 extending from the body 904. One or more antennas 916 extend lengthwise within one or more of the wings 912; however, in other embodiments, the antenna 916 may be positioned at other locations on the drone 204. For example, the antenna 916 may be near the rear of a wing 912 or may be positioned within the body 904 and/or nose. In other embodiments, the antenna may be attached to the one of the wings 912 or the body 904 so that it extends from the drone 204. The antenna 916 may be a stationary antenna or may be a steerable antenna. As noted before, by being an electronically and/or mechanically steerable, the antenna 916 is able to direct the signal to communicate with other drones 204 to enhance signal strength and/or conserve power. In one example, the antenna 916 includes a phased array type antenna such as those supplied by Harris Corporation of Melbourne, Florida, and in another example, the antenna 916 includes a gyroscopically stabilized type antenna. In another variation, the antenna 916 is an omnidirectional antenna. In still yet another variation, the drone can include a parabolic antenna. In one form, the drone 204 can act as a skywave repeater. When acting as a repeater, the drone can act as a passive and/or active repeater. When acting as an active repeater, the drone 204 receives the signal, processes the signal, and retransmits the signal to the next drone or ground station. When acting as a passive repeater, the drone simply reflects the signal. In one form, the drone includes a GPS station for locating the drone. The drone can be autonomously operated according to a specified flight plan. Alternatively and/or additionally, the drone 204 can be continuously and/or periodically updated to adjust its flight plan such as due to varying weather conditions such as storms and wind speed. As mentioned before, this information can be used to adjust the path of the drone so as to avoid inclement weather and/or adjust the flight path of the drone 204 to conserve energy based on the crab angle of the drone 204.

In some embodiments of the data communication system 200, each of the drones 204 may be able to communicate with the other drones 204 traveling between the transmitter 104 and the receiver 108. Communication between the drones 204 may assist with locating a preceding or trailing drone 204 and may also allow the drones 204 to maintain proper spacing. Each drone 204 may have a steerable antenna 916 that can be controlled to align with a steerable antenna 916 of other drones 204 within pathway. The steerable antenna 916 may allow the drones 204 to locate an adjacent drone and to also ensure that the data signal is transmitted in the correct direction to be received by an adjacent drone. The steerable antenna 916 may also be controlled so that it aligns with either the transmitter 104 or to the receiver 108. This may be needed when the drones 204 are not directly following the transmission path, as illustrated in FIG. 5.

The drone 204 may include one or more solar panels 920 on one or both of the wings 912. The solar panels 920 may be used to provide a source of power to the drone 204 as it travels on the path between the transmitter 104 and the receiver 108. In some embodiments, the solar panels 920 may be a supplemental source of power that provides additional power in conjunction with a battery, capacitor, fuel, and/or other type of power source. In other embodiments, the drone 204 may be designed so that it may travel along the path from the transmitter 104 to the receiver 108 only using wind power and solar power from the solar panels 920. Once more, the drone 204 in other examples can be in the form of an unpowered balloon or a low powered type aircraft, such as a blimp.

Figure 10:
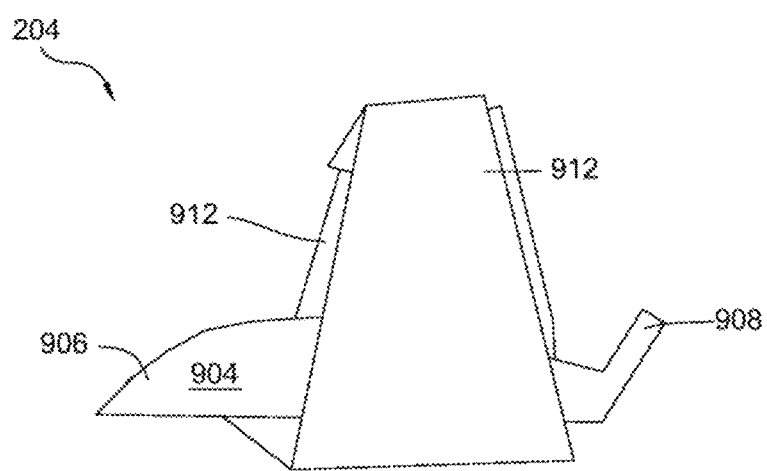
FIG. 10 is a perspective view of a shipping configuration of the drone of FIG. 9.

Drones 204 may be designed to make more than one flight, so that they may be reusable. To reuse a drone 204, it may be necessary to ship the drone 204 from the location at which it landed back to the location at which it was launched. As shown in FIG. 10, in some embodiments, the drone 204 may include foldable wings 912 that make the drone 204 more compact and could make the drone 204 easier to ship and reuse. Other portions of the drone 204, such as the tail 908, may also be foldable or removable to reduce size and to prevent breaking during shipping.

The drone 204 shown in FIGS. 9-10 is only one example of a type of drone that may be used with the data transmission system 200. Other types of drones may also be used in other embodiments. For example, antennas may be attached to drones including propellers and these drones may be programmed to fly along a predetermined path. The drones may also include additional instruments, such as a camera or a GPS receiver.

Glossary of Definitions and Alternatives

The language used in the claims and specification is to only have its plain and/ordinary meaning, except as explicitly defined below. The words in these definitions are to only have their plain and/ordinary meaning. Such plain and/ordinary meaning is inclusive of all consistent dictionary definitions from the most recently published Webster's and Random House dictionaries. As used in the specification and claims, the following definitions apply to the following terms or common variations thereof (e.g., singular/plural forms, past/present tenses, etc.):

"Antenna" or "Antenna system" generally refers to an electrical device, or series of devices, in any suitable configuration, that converts electric power into electromagnetic radiation. Such radiation may be either vertically, horizontally, or circularly polarized at any frequency along the electromagnetic spectrum. Antennas transmitting with circular polarity may have either right-handed or left-handed polarization.

In the case of radio waves, an antenna may transmit at frequencies ranging along the electromagnetic spectrum from extremely low frequency (ELF) to extremely high frequency (EHF). An antenna or antenna system designed to transmit radio waves may comprise an arrangement of metallic conductors (elements), electrically connected (often through a transmission line) to a receiver or transmitter. An oscillating current of electrons forced through the antenna by a transmitter can create an oscillating magnetic field around the antenna elements, while the charge of the electrons also creates an oscillating electric field along the elements. These time-varying fields radiate away from the antenna into space as a moving transverse electromagnetic field wave. Conversely, during reception, the oscillating electric and magnetic fields of an incoming electromagnetic wave exert force on the electrons in the antenna elements, causing them to move back and forth, creating oscillating currents in the antenna. These currents can then be detected by receivers and processed to retrieve digital or analog signals or data.

Antennas can be designed to transmit and receive radio waves substantially equally in all horizontal directions (omnidirectional antennas), or preferentially in a particular direction (directional or high gain antennas). In the latter case, an antenna may also include additional elements or surfaces which may or may not have any physical electrical connection to the transmitter or receiver. For example, parasitic elements, parabolic reflectors or horns, and other such non-energized elements serve to direct the radio waves into a beam or other desired radiation pattern. Thus antennas may be configured to exhibit increased or decreased directionality or "gain" by the placement of these various surfaces or elements. High gain antennas can be configured to direct a substantially large portion of the radiated electromagnetic energy in a given direction that may be vertical horizontal or any combination thereof.

Antennas may also be configured to radiate electromagnetic energy within a specific range of vertical angles (i.e. "takeoff angles") relative to the Earth in order to focus electromagnetic energy toward an upper layer of the atmosphere such as the ionosphere. By directing electromagnetic energy toward the upper atmosphere at a specific angle, specific skip distances may be achieved at particular times of day by transmitting electromagnetic energy at particular frequencies.

Other examples of antennas include emitters and sensors that convert electrical energy into pulses of electromagnetic energy in the visible or invisible light portion of the electromagnetic spectrum. Examples include light emitting diodes, lasers, and the like that are configured to generate electromagnetic energy at frequencies ranging along the electromagnetic spectrum from far infrared to extreme ultraviolet.

"Directional Antenna" or "Beam Antenna" generally refers to an antenna that radiates or receives greater power in specific directions allowing for increased performance and/or reduced interference from unwanted sources. Directional antennas typically, but not always, concentrate radiation in or from a desired direction.

"Steerable Antenna" generally refers to a directional antenna whose major lobe can be readily shifted in direction.

"Electronically Steerable Antenna" generally refers to a type of steerable antenna in which the beam of radio waves or other electromagnetic radiation can be electronically to pointed in different directions without physically moving the antenna. The electronically steerable antenna can for example include an active electronically scanned array (AESA) or a passive electronically scanned array (PESA). In one example, the electronically steerable antenna can include a phased array.

"Mechanically Steerable Antenna" generally refers to a type of steerable antenna in which the beam of radio waves or other electromagnetic radiation can be pointed in different directions by physically moving the antenna.

"Crab angle" generally refers to the amount of correction an aircraft, such as a UAV, must be turned into the wind in order to maintain a desired course. Typically, but not always, it is opposite in direction to the drift angle and approximately equal to the magnitude of the drift angle for small angles.

"Demodulator" generally refers to a device or system that is configured to perform demodulation. For instance, a demodulator can be in the form of an electronic circuit, processor, and/or software that is used to recover the information from a modulated carrier wave. In one example, the demodulator is in the form of a software-defined radio. Other examples of such a device include a "modem" (i.e., the contraction of the terms modulator and demodulator) which can perform modulation and demodulation. Demodulators can be used in connection with radio or wireless receivers, but many other systems use many kinds of demodulators, such as for wired transmission. For instance, a demodulator can be used to extract a digital data stream from a carrier signal which is carried through a telephone line, coaxial cable, and/or optical fiber.

"Demodulation" generally refers to a process or technique of extracting information from a modulated carrier wave. Generally speaking, demodulation is the inverse of modulation. There are numerous ways of demodulation depending on how parameters of the base-band signal are modulated. Examples of such techniques can include amplitude, frequency and/or phase demodulation. The output signal from the demodulation process can take many forms, including (but not limited to) analog signals and/or digital signals.

"Drift angle" generally refers to the angle between the heading of an aircraft, such as a UAV, and the track for the aircraft.

"Electromagnetic Radiation" generally refers to energy radiated by electromagnetic waves. Electromagnetic radiation is produced from other types of energy, and is converted to other types when it is destroyed. Electromagnetic radiation carries this energy as it travels moving away from its source at the speed of light (in a vacuum). Electromagnetic radiation also carries both momentum and angular momentum. These properties may all be imparted to matter with which the electromagnetic radiation interacts as it moves outwardly away from its source.

Electromagnetic radiation changes speed as it passes from one medium to another. When transitioning from one media to the next, the physical properties of the new medium can cause some or all of the radiated energy to be reflected while the remaining energy passes into the new medium. This occurs at every junction between media that electromagnetic radiation encounters as it travels.

The photon is the quantum of the electromagnetic interaction, and is the basic constituent of all forms of electromagnetic radiation. The quantum nature of light becomes more apparent at high frequencies as electromagnetic radiation behaves more like particles and less like waves as its frequency increases.

"Electromagnetic Spectrum" generally refers to the range of all possible frequencies of electromagnetic radiation. The electromagnetic spectrum is generally categorized as follows, in order of increasing frequency and energy and decreasing wavelength:

"Extremely low frequency" (ELF) generally designates a band of frequencies from about 3 to about 30 Hz with wavelengths from about 100,000 to 10,000 km long.

"Super low frequency" (SLF) generally designates a band of frequencies generally ranging between about 30 Hz to about 300 Hz with wavelengths of about 10,000 to about 1000 km long.

"Voice frequency" or "voice band" generally designates electromagnetic energy that is audible to the human ear. Adult males generally speak in the range between about 85 and about 180 Hz while adult females generally converse in the range from about 165 to about 255 Hz.

"Very low frequency" (VLF) generally designates the band of frequencies from about 3 kHz to about 30 kHz with corresponding wavelengths from about 10 to about 100 km long.

"Low-frequency" (LF) generally designates the band of frequencies in the range of about 30 kHz to about 300 kHz with wavelengths range from about 1 to about 10 km.

"Medium frequency" (MF) generally designates the band of frequencies from about 300 kHz to about 3 MHz with wavelengths from about 1000 to about 100 m long.

"High frequency" (HF) generally designates the band of frequencies from about 3 MHz to about 30 MHz having wavelengths from about 100 m to about 10 m long.

"Very high frequency" (VHF) generally designates the band of frequencies from about 30 Hz to about 300 MHz with wavelengths from about 10 m to about 1 m long.

"Ultra high frequency" (UHF) generally designates the band of frequencies from about 300 MHz to about 3 GHz with weight wavelengths ranging from about 1 m to about 10 cm long.

"Super high frequency" (SHF) generally designates the band of frequencies from about 3 GHz to about 30 GHz with wavelengths ranging from about 10 cm to about 1 cm long.

"Extremely high frequency" (EHF) generally designates the band of frequencies from about 30 GHz to about 300 GHz with wavelengths ranging from about 1 cm to about 1 mm long.

"Far infrared" (FIR) generally designates a band of frequencies from about 300 GHz to about 20 THz with wavelengths ranging from about 1 mm to about 15 μm long.

"Long-wavelength infrared" (LWIR) generally designates a band of frequencies from about 20 THz to about 37 THz with wavelengths ranging from about 15 μm to about 8 μm long.

"Mid infrared" (MIR) generally designates a band of frequencies from about 37 THz to about 100 THz with wavelengths from about 8 µm to about 3 µm long.

"Short wavelength infrared" (SWIR) generally designates a band of frequencies from about 100 THz to about 214 THz with wavelengths from about 3 µm to about 1.4 µm long "Near-infrared" (NIR) generally designates a band of frequencies from about 214 THz to about 400 THz with wavelengths from about 1.4 µm to about 750 nm long.

"Visible light" generally designates a band of frequencies from about 400 THz to about 750 THz with wavelengths from about 750 nm to about 400 nm long.

"Near ultraviolet" (NUV) generally designates a band of frequencies from about 750 THz to about 1 PHz with wavelengths from about 400 nm to about 300 nm long.

"Middle ultraviolet" (MUV) generally designates a band of frequencies from about 1 PHz to about 1.5 PHz with wavelengths from about 300 nm to about 200 nm long.

"Far ultraviolet" (FUV) generally designates a band of frequencies from about 1.5 PHz to about 2.48 PHz with wavelengths from about 200 nm to about 122 nm long.

"Extreme ultraviolet" (EUV) generally designates a band of frequencies from about 2.48 PHz to about 30 PHz with wavelengths from about 121 nm to about 10 nm long.

"Soft x-rays" (SX) generally designates a band of frequencies from about 30 PHz to about 3 EHz with wavelengths from about 10 nm to about 100 pm long.

"Hard x-rays" (HX) generally designates a band of frequencies from about 3 EHz to about 30 EHz with wavelengths from about 100 pm to about 10 pm long.

"Gamma rays" generally designates a band of frequencies above about 30 EHz with wavelengths less than about 10 pm long.

"Electromagnetic Waves" generally refers to waves having a separate electrical and a magnetic component. The electrical and magnetic components of an electromagnetic wave oscillate in phase and are always separated by a 90 degree angle. Electromagnetic waves can radiate from a source to create electromagnetic radiation capable of passing through a medium or through a vacuum. Electromagnetic waves include waves oscillating at any frequency in the electromagnetic spectrum including, but not limited to, radio waves, visible and invisible light, X-rays, and gamma-rays.

"Financial instrument" generally refers to a tradable asset of any kind. General examples include, but are not limited to, cash, evidence of an ownership interest in an entity, or a contractual right to receive or deliver cash or another financial instrument. Specific examples include bonds, bills (e.g. commercial paper and treasury bills), stock, loans, deposits, certificates of deposit, bond futures or options on bond futures, short-term interest rate futures, stock options, equity futures, currency futures, interest rate swaps, interest rate caps and floors, interest rate options, forward rate agreements, stock options, foreign-exchange options, foreign-exchange swaps, currency swaps, or any sort of derivative.

"Geodesic Line" generally refers to the shortest possible line between two points on a sphere or other curved surface.

"Ground" is used more in an electrical/electromagnetic sense and generally refers to the Earth's surface including land and bodies of water, such as oceans, lakes, and rivers.

"Ground-wave propagation" generally refers to a transmission method in which one or more electromagnetic waves are conducted via the boundary of the ground and atmosphere to travel along ground. The electromagnetic wave propagates by interacting with the semi-conductive surface of the Earth. In essence, the wave clings to the surfaces so as to follow the curvature of the Earth. Typically, but not always, the electromagnetic wave is in the form of a ground or surface wave formed by low-frequency radio waves.

"Heading" refers to the direction that an aircraft's nose, such as a nose for a UAV, is pointing. In one example, the heading is referenced by the magnetic compass and/or heading indicator which are two instruments that most, but not all, aircraft include. The heading can be the angle between the direction in which the aircraft's nose is pointing and a reference direction, (e.g. true north).

"Latency" generally refers to the time interval between a cause and an effect in a system. Latency is physically a consequence of the limited velocity with which any physical interaction can propagate throughout a system. Latency is physically a consequence of the limited velocity with which any physical interaction can propagate. The speed at which an effect can propagate through a system is always lower than or equal to the speed of light. Therefore every physical system that includes some distance between the cause and the effect will experience some kind of latency. For example, in a communication link or communications network, latency generally refers to the minimum time it takes for data to pass from one point to another. Latency with respect to communications networks may also be characterized as the time it takes energy to move from one point along the network to another. With respect to delays caused by the propagation of electromagnetic energy following a particular propagation path, latency can be categorized as follows:

"Low Latency" generally refers to a period of time that is less than or about equal to a propagation time that is 10% greater than the time required for light to travel a given propagation path in a vacuum. Expressed as a formula, low latency is defined as follows:

$$\text{latency}_{low} \leq \frac{d}{c} \cdot k \qquad \text{(Equation 1)}$$

where:
d=distance (miles)
c=the speed of light in a vacuum (186,000 miles/sec)
k=a scalar constant of 1.1

For example, light can travel 25,000 miles through a vacuum in about 0.1344 seconds. A "low latency" communication link carrying data over this 25,000 mile propagation path would therefore be capable of passing at least some portion of the data over the link in about 0.14784 seconds or less.

"High Latency" generally refers to a period of time that is over 10% greater than the time required for light to travel a given propagation path in a vacuum. Expressed as a formula, high latency is defined as follows:

$$\text{latency}_{high} > \frac{d}{c} \cdot k \qquad \text{(Equation 2)}$$

where:
d=distance (miles)
c=the speed of light in a vacuum (186,000 miles/sec)
k=a scalar constant of 1.1

For example, light can travel 8,000 miles through a vacuum in about 0.04301 seconds. A "high latency" communication link carrying data over this transmission path would therefore be capable of passing at least some portion of the data over the link in about 0.04731 seconds or more.

The "high" and "low" latency of a network may be independent of the data bandwidth. Some "high" latency networks may have a high transfer rate that is higher than a "low" latency network, but this may not always be the case. Some "low" latency networks may have a data bandwidth that exceeds the bandwidth of a "high" latency network.

"Memory" generally refers to any storage system or device configured to retain data or information. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, each memory may be volatile, nonvolatile, or a hybrid combination of volatile and nonvolatile varieties.

"Modulation" generally refers to a process of varying one or more properties of a periodic waveform, called a carrier signal, with a modulating signal that represents information to be transmitted. Common examples of modulation techniques include, but are not limited to, Frequency Modulation (FM), Amplitude Modulation (AM), Phase-Shift Keying (PSK), Frequency Shift Keying (FSK), Amplitude Shift Keying (Ask), off Keying (Oh Okay) Quadrature Amplitude Modulation (QAM) Continuous Phase Modulation (CPM), Orthogonal Frequency Division Multiplexing (OFD M) Wavelet Modulation, Trellis Coded Modulation (TCM), Direct Sequence Spread Spectrum (DSSS), Troop Spread Spectrum (CSS), and Frequency Hopping Spread Spectrum (FHSS).

"Modulator" generally refers to a device that is configured or adapted to perform modulation. One example of such a device is a "modem" which can perform both modulation and demodulation.

"Non-sky-wave propagation" generally refers to all forms of transmission, wired and/or wireless, in which the information is not transmitted by reflecting an electromagnetic wave from the ionosphere.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement, such as one or more PENTIUM, i3, i5 or i7 processors supplied by INTEL Corporation of 2200 Mission College Boulevard, Santa Clara, Calif. 95052, USA.

Another example of a processor is an Application-Specific Integrated Circuit (ASIC). An ASIC is an Integrated Circuit (IC) customized to perform a specific series of logical operations is controlling the computer to perform specific tasks or functions. An ASIC is an example of a processor for a special purpose computer, rather than a processor configured for general-purpose use. An application-specific integrated circuit generally is not reprogrammable to perform other functions and may be programmed once when it is manufactured.

In another example, a processor may be of the "field programmable" type. Such processors may be programmed multiple times "in the field" to perform various specialized or general functions after they are manufactured. A field-programmable processor may include a Field-Programmable Gate Array (FPGA) in an integrated circuit in the processor. FPGA may be programmed to perform a specific series of instructions which may be retained in nonvolatile memory cells in the FPGA. The FPGA may be configured by a customer or a designer using a hardware description language (HDL). In FPGA may be reprogrammed using another computer to reconfigure the FPGA to implement a new set of commands or operating instructions. Such an operation may be executed in any suitable means such as by a firmware upgrade to the processor circuitry.

Just as the concept of a computer is not limited to a single physical device in a single location, so also the concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, the unknown number may automatically change over time as well.

The concept of a "processor" includes a device configured or programmed to make threshold comparisons, rules comparisons, calculations, or perform logical operations applying a rule to data yielding a logical result (e.g. "true" or "false"). Processing activities may occur in multiple single processors on separate servers, on multiple processors in a single server with separate processors, or on multiple processors physically remote from one another in separate computing devices.

"Radio" generally refers to electromagnetic radiation in the frequencies that occupy the range from 3 kHz to 300 GHz.

"Radio horizon" generally refers to the locus of points at which direct rays from an antenna are tangential to the ground. The radio horizon can be approximated by the following equation:

$$d \cong \sqrt{2h_t} + \sqrt{2h_r} \qquad \text{(Equation 3)}$$

where:
d=radio horizon (miles)
$h_t$=transmitting antenna height (feet)
$h_r$=receiving antenna height (feet).

"Receive" generally refers to accepting something transferred, communicated, conveyed, relayed, dispatched, or forwarded. The concept may or may not include the act of listening or waiting for something to arrive from a transmitting entity. For example, a transmission may be received without knowledge as to who or what transmitted it. Likewise the transmission may be sent with or without knowledge of who or what is receiving it. To "receive" may include, but is not limited to, the act of capturing or obtaining electromagnetic energy at any suitable frequency in the electromagnetic spectrum. Receiving may occur by sensing electromagnetic radiation. Sensing electromagnetic radiation may involve detecting energy waves moving through or from a medium such as a wire or optical fiber. Receiving includes receiving digital signals which may define various types of analog or binary data such as signals, datagrams, packets and the like.

"Receiving Station" generally refers to a receiving device, or to a location facility having multiple devices configured to receive electromagnetic energy. A receiving station may be configured to receive from a particular transmitting entity, or from any transmitting entity regardless of whether the transmitting entity is identifiable in advance of receiving the transmission.

"Remote" generally refers to any physical, logical, or other separation between two things. The separation may be relatively large, such as thousands or millions of miles or kilometers, or small such as nanometers or millionths of an inch. Two things "remote" from one another may also be logically or physically coupled or connected together.

"Repeater" generally refers to an electronic device that receives a signal and retransmits the signal. Repeaters are typically, but not always, used to extend the transmissions so that the signal can cover longer distances or be received on the other side of an obstruction. In some types of repeaters, an identical signal is retransmitted, but in other variations, a different signal can be retransmitted. For example, the different signal can be retransmitted on one or more different frequencies, baud rates, and/or formats. The signal can be in the form of a passive repeater that simply reflects and/or refracts the electromagnetic wave. In another variation, this repeater can be an active repeater that receives, processes, and retransmits the signal. The repeater can include an analog repeater that retransmits an analog signal and/or a digital repeater that retransmits binary digital signals.

"Route" generally refers to a track an object, such as an aircraft, is intended to follow. In other words, the route is an established or selected course of travel.

"Satellite communication" or "satellite propagation" generally refers to transmitting one or more electromagnetic signals to a satellite which in turn reflects and/or retransmits the signal to another satellite or station.

"Signal" generally refers to a detectable physical quantity and/or impulse by which information and/or instructions can be transmitted. The physical properties being measured to determine the signal for example can include sound, light, and/or electromagnetic radiation, to name just a few. For instance, electrical voltage and/or electrical current can be measured to determine an electrical signal transmitted by a wire, and changes to electromagnetic field amplitude, frequency, phase, intensity, and/or strength can also be used to send and detect a signal wirelessly.

"Size" generally refers to the extent of something; a thing's overall dimensions or magnitude; how big something is. For physical objects, size may be used to describe relative terms such as large or larger, high or higher, low or lower, small or smaller, and the like. Size of physical objects may also be given in fixed units such as a specific width, length, height, distance, volume, and the like expressed in any suitable units.

For data transfer, size may be used to indicate a relative or fixed quantity of data being manipulated, addressed, transmitted, received, or processed as a logical or physical unit. Size may be used in conjunction with the amount of data in a data collection, data set, data file, or other such logical unit. For example, a data collection or data file may be characterized as having a "size" of 35 Mbytes, or a communication link may be characterized as having a data bandwidth with a "size" of 1000 bits per second.

"Sky-wave propagation" refers generally to a transmission method in which one or more electromagnetic-waves radiated from an antenna are refracted from the ionosphere back to the ground. Sky-wave propagation further includes tropospheric scatter transmissions. In one form, a skipping method can be used in which the waves refracted from the ionosphere are reflected by the ground back up to the ionosphere. This skipping can occur more than once.

"Space-wave propagation" or sometimes referred to as "direct wave propagation" or "line-of-sight propagation" generally refers to a transmission method in which one or more electromagnetic waves are transmitted between antennas that are generally visible to one another. The transmission can occur via direct and/or ground reflected space waves. Generally speaking, the antenna height and curvature of the Earth are limiting factors for the transmission distances for space-wave propagation. The actual radio horizon for a direct line of sight is larger than the visible or geometric line of sight due to diffraction effects; that is, the radio horizon is about 4/5 greater than the geometric line of sight.

"Spread spectrum" generally refers to a transmission method that includes sending a portion of a transmitted signal over multiple frequencies. The transmission over multiple frequencies may occur simultaneously by sending a portion of the signal on various frequencies. In this example, a receiver must listen to all frequencies simultaneously in order to reassemble the transmitted signal. The transmission may also be spread over multiple frequencies by "hopping" signals. A signal hopping scenario includes transmitting the signal for some period of time over a first frequency, switching to transmit the signal over a second frequency for a second period of time, before switching to a third frequency for a third period of time, and so forth. The receiver and transmitter must be synchronized in order to switch frequencies together. This process of "hopping" frequencies may be implemented in a frequency-hopping pattern that may change over time (e.g. every hour, every 24 hours, and the like).

"Track" generally refers to the direction of movement of an object such as an aircraft.

"Transmission Path" or "Propagation Path" generally refers to path taken by electromagnetic energy passing through space or through a medium. This can include transmissions through a transmission line. In this case, the transmission path is defined by, follows, is contained within, passes through, or generally includes the transmission line. A transmission or propagation path need not be defined by a transmission line. A propagation or transmission path can be defined by electromagnetic energy moving through free space or through the atmosphere such as in skywave, ground wave, line-of-site, or other forms of propagation. In that case, the transmission path can be characterized as any path along which the electromagnetic energy passes as it is moves from the transmitter to the receiver, including any skip, bounce, scatter, or other variations in the direction of the transmitted energy.

"Transmission Station" generally refers to a transmitting device, or to a location or facility having multiple devices configured to transmit electromagnetic energy. A transmission station may be configured to transmit to a particular receiving entity, to any entity configured to receive transmission, or any combination thereof.

"Transmit" generally refers to causing something to be transferred, communicated, conveyed, relayed, dispatched, or forwarded. The concept may or may not include the act of conveying something from a transmitting entity to a receiving entity. For example, a transmission may be received without knowledge as to who or what transmitted it. Likewise the transmission may be sent with or without knowledge of who or what is receiving it. To "transmit" may include, but is not limited to, the act of sending or broadcasting electromagnetic energy at any suitable frequency in the electromagnetic spectrum. Transmissions may include digital signals which may define various types of binary data such as datagrams, packets and the like. A transmission may also include analog signals.

"Triggering Data" generally refers to data that includes triggering information identifying one or more commands to execute. The triggering data and the command data may occur together in a single transmission or may be transmitted separately along a single or multiple communication links.

"Unmanned Aerial Vehicle (UAV)" or "Drone" generally refers to an aircraft without a human pilot aboard. A UAV may be operated via a ground-based controller by a human and/or can be operated autonomously using an onboard computer. A UAV may also operate without human or computer aided control and may be directed by environmental factors such as wind speed and wind direction. A drone may be powered or unpowered. A UAV may include a combustion type engine (e.g., a turbine) that is powered with fuel and/or may use alternative power sources such as electrical motors that are powered with solar cells and/or a battery. By way of non-limiting examples, the UAV can include balloons, dirigible airships, blimps, airplanes, helicopters, quadcopters, gliders, and/or other types of aircraft.

"Wave Guide" generally refers to a transmission line configured to guides waves such as electromagnetic waves occurring at any frequency along the electromagnetic spectrum. Examples include any arrangement of conductive or insulative material configured to transfer lower frequency electromagnetic radiation ranging along the electromagnetic spectrum from extremely low frequency to extremely high frequency waves. Others specific examples include optical fibers guiding high-frequency light or hollow conductive metal pipe used to carry high-frequency radio waves, particularly microwaves.

It should be noted that the singular forms "a", "an", "the", and the like as used in the description and/or the claims include the plural forms unless expressly discussed otherwise. For example, if the specification and/or claims refer to "a device" or "the device", it includes one or more of such devices.

It should be noted that directional terms, such as "up", "down", "top" "bottom", "fore", "aft", "lateral", "longitudinal", "radial", "circumferential", etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

What is claimed is:

1. A system, comprising:
   a transmitter configured to wirelessly transmit a data signal along a transmission path;
   a receiver configured to receive the data signal, wherein the receiver is positioned at a different location along the transmission path than the transmitter;
   at least two drones arranged in series and positioned along the transmission path between the transmitter and the receiver;
   wherein one of the drones is configured to receive the data signal from the transmitter and transmit the data signal to another of the drones;
   wherein one of the drones is configured to receive the data signal from another of the drones and transmit the data signal to the receiver;
   wherein the transmission path is a geodesic line;
   wherein the drones are configured to generally follow the geodesic line when flying;
   wherein the drones are configured to stay within a zone surrounding the geodesic line;
   wherein the drones include a steerable antenna; and
   wherein the steerable antenna is configured to monitor the spacing of one of the drones with respect to the other drones.

2. The system of claim 1, wherein the drones are winged.

3. The system of claim 1, wherein the drones are launched from a location upwind of the receiver.

4. The system of claim 1, wherein the drones are launched from a location within range of the transmitter.

5. The system of claim 1, wherein the drones land at a location within range of the receiver.

6. The system of claim 1, wherein the steerable antenna is configured to monitor the position of other drones.

7. The system of claim 1, wherein the data signal is transmitted using microwaves.

8. The system of claim 1, wherein at least one of the drones includes a solar panel.

9. A method, comprising:
   launching a series of drones so that the drones travel along a transmission path between a transmitter and a receiver;
   transmitting a data signal from the transmitter to a drone in the series of drones within range of the transmitter;
   retransmitting the data signal from the drone that received the data signal from the transmitter to another drone in the series of drones;
   transmitting the data signal to the receiver from a drone in the series of drones within range of the receiver;
   wherein the transmission path is a geodesic line;
   flying the series of drones to generally follow the geodesic line;
   maintaining the series of drones within a zone surrounding the geodesic line;
   monitoring the position of the drones within the series of drones with a steerable antenna positioned on at least one of the drones; and
   monitoring the spacing of the drones within the series of drones with a steerable antenna positioned on at least one of the drones.

10. The method of claim 9, further comprising:
    launching the drones in a series of drones from a location within range of the transmitter.

11. The method of claim 9, further comprising:
    launching the drones in a series of drones from a location upwind of the receiver.

12. The method of claim 9, further comprising:
    landing a drone from the series of drones after the drone transmits a data signal to the receiver.

13. The method of claim 12, wherein the drones land at a location within range of the receiver.

14. The method of claim 12, further comprising:
    returning a drone that has landed to the location from which the drones in a series of drones are launched.

15. The method of claim 9, wherein data signal is transmitted using microwaves.

16. The system of claim 1, wherein:
the drones are launched from a location upwind of the receiver;
the drones are launched from a location within range of the transmitter;
the drones land at a location within range of the receiver;
the transmitter and the receiver are located at a distance greater than a radio horizon of the transmitter; and
the data signal concerns a transaction for a financial instrument.

* * * * *